(12) United States Patent
Marumoto (10) Patent No.: US 8,154,764 B2
(45) Date of Patent: Apr. 10, 2012

(54) IMAGE PROCESSING APPARATUS, PRINTING APPARATUS AND IMAGE PROCESSING METHOD WITH GENERATION OF BINARY DATA ACCORDING TO A CORRESPONDENCE RELATIONSHIP DEFINED BY A DOT ARRANGEMENT PATTERN

(75) Inventor: Yoshitomo Marumoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 756 days.

(21) Appl. No.: 12/279,161

(22) PCT Filed: Dec. 14, 2007

(86) PCT No.: PCT/JP2007/074594
§ 371 (c)(1),
(2), (4) Date: Aug. 12, 2008

(87) PCT Pub. No.: WO2008/075755
PCT Pub. Date: Jun. 26, 2008

(65) Prior Publication Data
US 2009/0086231 A1    Apr. 2, 2009

(30) Foreign Application Priority Data

Dec. 19, 2006  (JP) .................................. 2006-341383

(51) Int. Cl.
*H04N 1/60* (2006.01)
(52) U.S. Cl. ...... 358/1.9; 358/1.13; 358/1.15; 358/3.26; 382/174; 382/175

(58) Field of Classification Search .................. None
See application file for complete search history.

(56) References Cited

U.S. PATENT DOCUMENTS
5,111,310 A    5/1992  Parker et al.
(Continued)

FOREIGN PATENT DOCUMENTS
EP        0 564 252 A2    10/1993
(Continued)

OTHER PUBLICATIONS

R. W. Floyd, et al., "An Adaptive Algorithm for Spatial Greyscale," SDI Int'l. Sym. Digest of Tech. Papers, pp. 75-77, vol. 17/2 (1976).

*Primary Examiner* — King Poon
*Assistant Examiner* — Dung Tran
(74) *Attorney, Agent, or Firm* — Fitzpatrick, Cella, Harper & Scinto (57) ABSTRACT

17-valued data of a pixel in a multi-valued image is divided into two divisions for a two-pass printing, obtaining the division data. Next, by using an index pattern where arrangements of the numerals of 1 to 16 are dispersed, each dot data of C, M and Y in the division data is arranged. First, six dot data of C are assigned to the respective minor pixels of the numerals of 1 to 6 in accordance with a value of C1=6. Next, four dot data of M are assigned to the respective minor pixels of the numerals of 7 to 10 in accordance with a value of M1=4. Further, one dot data of Y is assigned to the minor pixel of the numerals of 11 in accordance with a value of Y1=1.

5 Claims, 9 Drawing Sheets

U.S. PATENT DOCUMENTS

| | | |
|---|---|---|
| 6,213,586 B1 | 4/2001 | Chen |
| 7,258,412 B2 * | 8/2007 | Maru et al. ....................... 347/15 |
| 7,261,387 B2 * | 8/2007 | Nishikori et al. ................ 347/15 |
| 7,303,247 B2 * | 12/2007 | Maru et al. ....................... 347/15 |
| 7,641,309 B2 * | 1/2010 | Teshigawara et al. ........... 347/43 |
| 7,742,181 B2 * | 6/2010 | Nakano ......................... 358/1.14 |
| 7,924,465 B2 * | 4/2011 | Ike et al. ....................... 358/3.06 |
| 7,929,183 B2 * | 4/2011 | Kakutani ...................... 358/3.16 |
| 7,957,031 B2 * | 6/2011 | Kakutani ...................... 358/3.01 |
| 2005/0035996 A1 * | 2/2005 | Maru et al. ....................... 347/43 |
| 2005/0073543 A1 * | 4/2005 | Nishikori et al. ................ 347/15 |
| 2005/0219278 A1 | 10/2005 | Hudson |
| 2005/0231742 A1 * | 10/2005 | Hirano ........................... 358/1.9 |
| 2006/0044338 A1 * | 3/2006 | Maru et al. ....................... 347/15 |
| 2006/0193010 A1 * | 8/2006 | Kakutani ...................... 358/3.13 |
| 2006/0227160 A1 * | 10/2006 | Takahashi et al. ............... 347/15 |
| 2007/0121137 A1 * | 5/2007 | Kakutani ....................... 358/1.9 |

FOREIGN PATENT DOCUMENTS

| | | |
|---|---|---|
| EP | 0 863 478 A2 | 9/1998 |
| EP | 0 979 734 A1 | 2/2000 |
| EP | 1 029 693 A1 | 8/2000 |
| EP | 1 294 176 A2 | 3/2003 |
| JP | 2622429 B2 | 4/1997 |
| JP | 2001-150700 A | 6/2001 |
| JP | 2001-298617 A | 10/2001 |
| WO | 92/10905 A1 | 6/1992 |

* cited by examiner

FIG.1

FIG.2A BINARY DATA PATTERN

FIG.2B MASK PATTERN

FIG.2C FIRST PASS

FIG.2D SECOND PASS

PRIOR ART

IMAGE PROCESSING APPARATUS, PRINTING APPARATUS AND IMAGE PROCESSING METHOD WITH GENERATION OF BINARY DATA ACCORDING TO A CORRESPONDENCE RELATIONSHIP DEFINED BY A DOT ARRANGEMENT PATTERN

TECHNICAL FIELD

The present invention relates to an image processing apparatus, a printing apparatus and an image processing method, and in particular to generation of image data used for dividedly forming an image to be printed on a printing medium by plural times of scans of a printing head.

BACKGROUND ART

With a prevalence of information processing apparatuses such as a personal computer, a printing apparatus as am image generation terminal is also widely prevalent. In particular, an ink-jet printing apparatus which ejects ink from ejection openings onto the printing medium such as a paper to perform printing has various advantages, such as a non-impact and low noise printing system, a high density and a high speed printing operation, and easy application for color printing. From these points, the ink-jet printing apparatus is becoming a mainstream one in the field of a printing apparatus for personal use.

Such wide use of the ink-jet printing technology has required further improvement in print image quality. Particularly, since there is recently an environment where photos can be printed at home with ease by a print system, a quality of a print image not less degraded than in a silver halide photography has been demanded. In comparison with such sliver halide photography, a granular feeling in a print image is one of the conventional problems. On the other hand, various configurations of the print system for reducing the granular feeling are proposed.

For example, there is known an ink-jet printing apparatus using normal ink of cyan, magenta, yellow and black and further, ink of light cyan and light magenta which are lower in concentration of a color material such as dyestuff than the normal ink. Such an apparatus reduces a granular feeling by using ink of light cyan and light magenta in an area where the print density is low. In addition, in an area of high density, use of ink of cyan and magenta having a normal density realizes a wider color reproduction range and smooth gradation sequence properties.

Also, there is known a method of designing a size of a dot formed in the printing medium to be made small for reducing a granular feeling. For realizing this, there has been advancing the technology of reducing an amount of an ink droplet ejected from an ejection opening of the printing head. In this case, in addition to making an amount of an ink droplet be small, arranging many ejection openings in high density causes a high resolution image to be simultaneously obtained without impairing printing speeds.

Besides the aforementioned granular feeling reducing technology of focusing attention on the ink to be used, the technology of focusing attention on an area coverage modulation method is known as that of reducing a granular feeling by means of image processing. An ink-jet printing apparatus determines the number of dots to be formed to a pixel and carries out the printing according to the determined number of dots. In this processing, the multi-valued image data having density information is subjected to a quantization process to be finally converted into binary data, that is, data for determining execution/nonexecution of dot formation. The print image of an area having the extent which is macroscopically observed, the density or the gradation is expressed by the number and the arrangement of printed dots. Such expression of density or gradation is generally called as an area coverage modulation method. The area coverage modulation method includes various dot arrangements for expressing the same density. For example, there is known a dot arrangement according to an error diffusion method as described in a paper by R. Floid and L. Steinberg: "Adaptive Algorithm for Spatial Grey Scale", SDI Int'l. Sym. Digest of Tech. Papers, paragraphs 36 to 37 (1975). In addition, as a method other than the error diffusion method, there is known a dot arrangement by an ordered dither method as disclosed in Japanese Patent No. 2622429 or Japanese Patent Laid-Open No. 2001-298617. These methods can create an image having a good visual perception in which an arrangement of formed dots is excellent in dispersion properties and low frequency components in a spatial frequency of the dot arrangement is few.

A so-called serial type of the ink-jet printing apparatus widely employs a multi pass method. It should be noted that words "pass" and "scan" used hereinafter have the same meaning. In the multi pass printing, an image data for a unit area is divided into data for each color and each pass and masks are widely used for the division.

Figure 1:
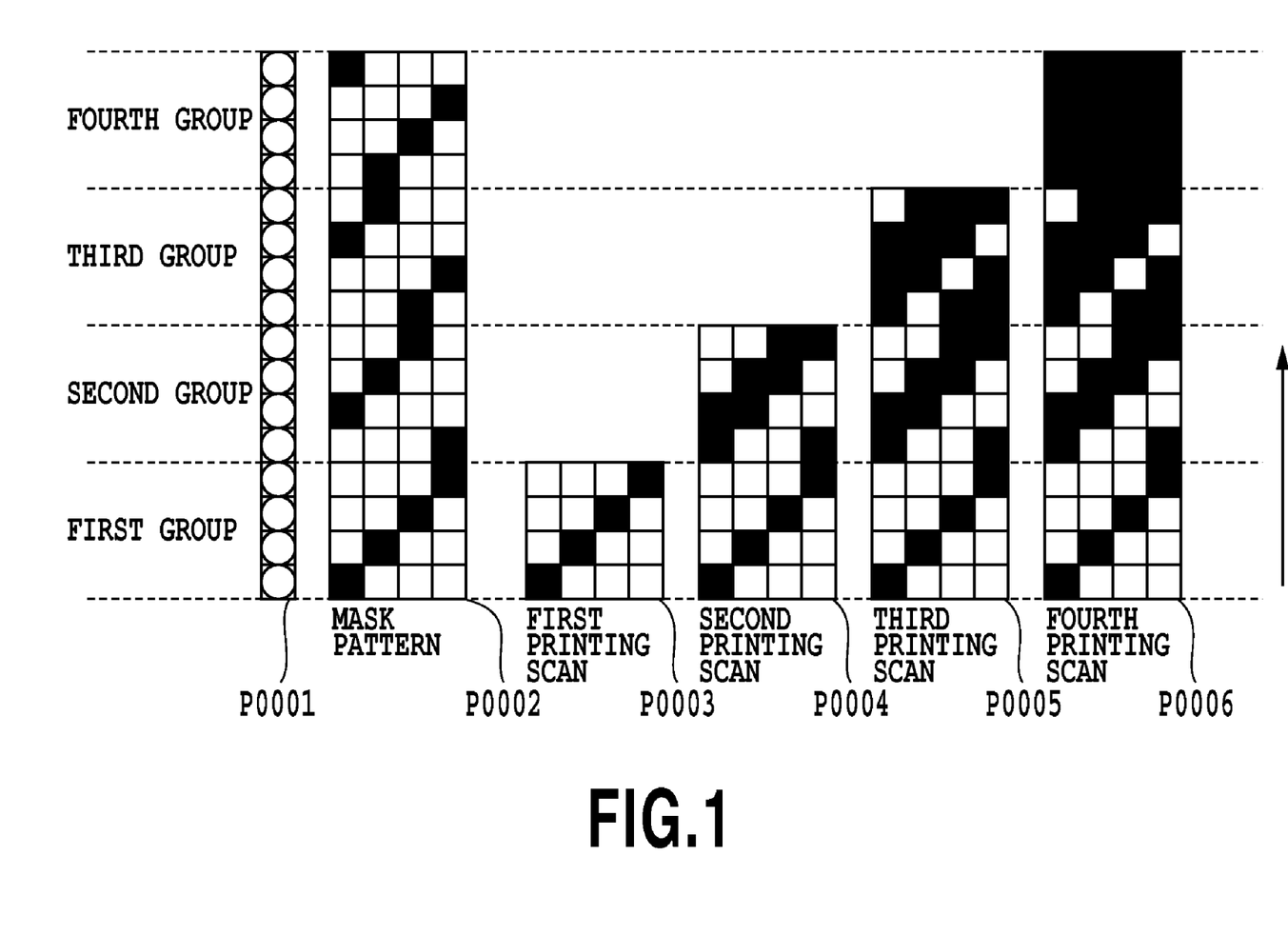

FIG. 1 is a diagram for explaining the multi pass printing and schematically shows a printing head and dot patterns printed in a case of completing an image by four times of scans. In FIG. 1, P0001 denotes a printing head. Here, for simplifying its illustration and explanation, the printing head having sixteen ejection openings (hereinafter, also referred to as nozzle) is shown. The nozzle array is, as shown in FIG. 1, divided into four groups of a first to a fourth group, each including four nozzles for use. P0002 denotes a mask pattern where areas of a mask which permits printing (print permitting area) corresponding to each nozzle are painted in black. The mask patterns corresponding to four nozzle groups are complementary with each other. When the four mask patterns are overlapped, all the areas of 4×4 constitute the print permitting area. That is, four mask patterns is used to complete printing in all the areas of 4×4.

P0003 to P0006 denote arrangement patterns of formed dots and show the process in which an image is completed by executing plural times of printing scans. As shown in this pattern, in a multi pass printing, each printing scan forms dots based upon binary image data (dot data) generated with use of the mask patterns corresponding to nozzle groups respectively. In addition, each time the printing scan is completed, a printing medium is conveyed in an arrow direction by the width amount of one nozzle group. In this way, for areas corresponding to the width of respective nozzle groups in the printing medium, images of respective areas are completed by four times of printing scans.

According to the multi pass printing as described above, density unevenness due to a variation in an ejection direction or an amount of ink between plural nozzles possibly generated in the manufacturing process of a print head or to an error in paper conveying that is performed between printing scans can be hard to be observed.

It should be noted that in FIG. 1, the four-pass printing in which scanning the same image area (unit area) is executed four times is shown, but the multi pass printing is not limited to this four-pass printing. A two-pass printing in which an image is completed by twice of printing scans, a three-pass printing in which an image is completed by three times of printing scans, or a five or more-pass printing in which an image is completed by five or more times of printing scans may be applied.

In the multi pass printing, a number of printed dots in each printing scan can be adjusted or an operation frequency of a nozzle for which a trouble is easy to occur can be reduced, by changing an arrangement of a print permitting area in a mask pattern. That is, the multi pass printing can have modes in accordance with various purposes other than elimination of the above described density unevenness or bandings.

As described above, according to the recent ink-jet printing system, it is possible to output a stable image with a high quality at a high speed by wide variety of ink, implementation of various multi pass printings, adoption of a preferable area coverage modulation method (binarization method) and the like.

According to the studies by the inventor of the present invention, however, in the recent ink-jet printing system, with remarkable advancement of high speeding, high density and wide variety of ink kinds, it is confirmed that new problems which have no been confirmed so far are occurring. The high speeding, the high density and the increasing used ink kinds cause an increase in an amount of ink applied per unit time and unit area of the printing medium. In this case, depending on kinds of the printing medium, even if all the amount of ink applied can be finally absorbed, the absorbing speed may not correspond to an applying speed of the ink. More specifically, even if all the applied ink is finally absorbed and problems such as fixing properties or smears do not occur, ink droplets on the surface of the printing medium which are not yet absorbed may be contacted with each other during stages of scanning several times before completing an image. Then it is confirmed that this causes problems in a subsequent image.

For example, it is considered that a case where an image of blue expressed by cyan ink and magenta ink is printed by a multi pass printing system of a two-pass. In most of serial type ink-jet printing apparatuses, printing heads of fundamental four-color ink of cyan, magenta, yellow and black are arranged in parallel with one another in a primary scanning direction. In consequence, ink of each color is applied onto the same area of the printing medium by the same printing scan. More specifically, in the above case, ink based on data of cyan and magenta obtained by thinning the dot data of cyan and magenta respectively to be ½ is applied onto the printing medium with an extremely short time difference in the same printing scan. In this scanning, when the applied cyan and magenta ink droplets exist at the same position or at the neighboring positions, and the ink droplets are pulled with each other by mutual surface tensions so that a dot of two or more droplets of ink (hereinafter, also referred to as grain) may be formed. Once such grain is formed, the ink applied at a position close to the grain tends to be pulled to it. That is, the grain first generated becomes a core to gradually grow and finally forms a large grain. Such grain remarkably appears mostly in a high density area having a great applying amount of ink. Then, in a uniform image area, the state where that such large grains are irregularly dispersed is recognized, which causes a degradation of an image, so-called beading.

The phenomenon of the above grain is basically generated by applying a plurality of ink for a relatively short time in close proximity to each other and the degree of the pulling force depends on the mutual surface tensions of the ink. Formation of the grain, however, does not rely only on the mutual surface tensions of the ink. For example, in a case where the ink and a liquid that reacts with the ink and causes the ink to be coagulated are applied in the same scanning, the contacted, respective ink and liquid may be connected by a stronger chemical reaction to form a grain core.

In addition, in the case that the inks of the same color are applied during same scan such as inks of the same color is printed by using two arrays of the nozzles in the same scanning, the grain may be generated among the inks. Further, depending on an absorbing characteristic of ink into a printing medium, when inks to be applied at different scans in the multi pass printing is applied in close proximity to each other, the above grain may be generated.

One of causes of the aforementioned grain problem is an interference between a mask pattern for multi pass and an image data.

Figure 2A:
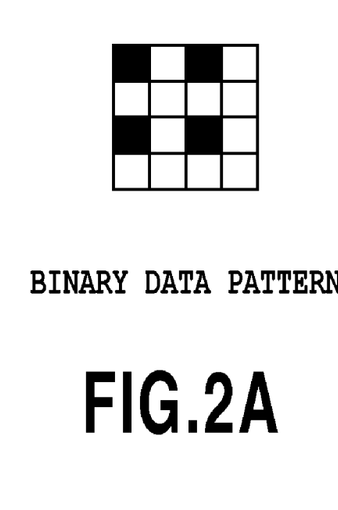
FIGS. 2A to 2D are diagrams for explaining the problem caused by interference for mask patterns used in quantization of printed data.
Figure 2B:
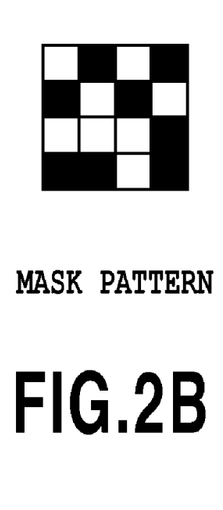

FIGS. 2A to 2D are diagrams explaining the problem caused due to interference. FIG. 2A shows a pattern of binary image data of cyan and FIG. 2B shows a mask pattern (print permitting areas are 50%) for a first pass among mask patterns of cyan for two pass printing. A size of the pattern of the binary image data in FIG. 2A is 4×4. On the other hand, the mask pattern in FIG. 2B is a mask arranging print permitting areas in size of 4×4 and corresponds to the pattern of the binary image data one to one.

Figure 2C:
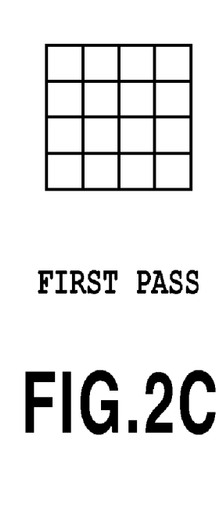
Figure 2D:
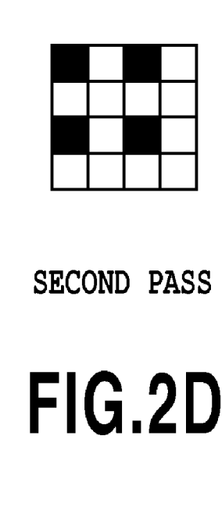

In this case, at the first pass, a dot pattern shown in FIG. 2C which is an AND data of the mask pattern and the binary image data pattern is to be printed. More specifically, the binary image data shown in FIG. 2A shows four dots to be formed, but in fact, the number of dots formed at the first pass is zero. In contrast, at the second pass shown in FIG. 2D, all of the remaining four dots are formed. In this way, interference between the mask pattern and the binary image data (dot data) occurs, thereby possibly bringing about various problems, such as the problem that an original effect of the multi-pass printing is not achieved sufficiently. In addition to the example shown in FIGS. 2A to 2D, there may occur the reverse case, that is, a case where at the first pass, four dots are formed and at the second pass, the number of the formed dot is zero. In addition, this interference possibly occurs in combinations of various binary image data patterns and corresponding pass mask patterns regardless of a size of the data.

The interference as described above possibly occurs in parts of the mask processing for each scan to the entire binary image data. Then, a deviation of the dots to a certain scan due to the interference shown above may lead to occurrence of a grain at the time of generating an image (hereinafter, also referred to as intermediate image) at a halfway to completing the image by plural times of scans in the aforementioned multi pass printing.

According to the conventional system as described above, in a case of completing an image by superimposing plural divided images having a different formation timing, since dispersion of dot arrangement obtained by superimposing images among the divided images for respective formation timings is not considered, occurrence of the grain in the intermediate image can not be restricted.

DISCLOSURE OF THE INVENTION

An object of the present invention is to provide an image processing apparatus, a printing apparatus and an image processing method which, in a case of completing an image by superposing plural divided images each having a different formation timing, can generate dot data of the divided images so that a grain in the image is prevented from occurring.

In the first aspect of the present invention, there is provided an image processing apparatus that generates data of dots composing each of a plurality of divided images for completing an image with superimposing the plurality of divided images, which differ from each other in formation timing, the apparatus comprising: a generator for generating data of dots composing each of pixels of same positions in the plurality of divided images, according to a dot arrangement pattern for determining dots to be assigned to a plurality of areas in the pixel, wherein the generator generates the data of dots to compose each of the pixels of the same position, according to a dot arrangement order which is defined for the plurality of areas of the dot arrangement pattern.

In the second aspect of the present invention, there is provided an image processing apparatus that generates data of dots composing each of a plurality of divided images for completing an image with superimposing the plurality of divided images, which differ from each other in formation timing, the apparatus comprising: an obtaining unit for obtaining a plurality of multi-valued data corresponding to the plurality of divided images; and a generator for generating data of dots composing each of pixels of same positions shown by the plurality of multi-valued imaged at a obtained by the obtaining unit, according to a dot arrangement order which is defined for L areas of a dot arrangement pattern for determining dots to be assigned to the L areas in the pixel, wherein the generator generates the data of dots so that X ($1 \leq X \leq L$) dots composing the pixel of the divided image formed at precedent formation timing are assigned to areas of the arrangement order of first to Xth, and generates the data of dots so that Y ($1 \leq Y \leq L$) dots composing the pixel of the divided image formed at subsequent formation timing are assigned to areas of the arrangement order of (X+1)th to (X+1+Y)th.

In the third aspect of the present invention, there is provided an image processing apparatus that generates data of dots composing each of a plurality of divided images, for completing an image to be formed on a unit area of a printing medium by performing scanning of an ink-jet head for forming the dots plurality of times onto the unit area so as to superimpose the plurality of divided images on the unit area in the plurality of times of scanning, the apparatus comprising: a divider for dividing multi-valued image data representing an image to be formed on the unit area into multi-valued data corresponding to the plurality of divided images; and a generator for generating data of dots composing each of pixels of same positions shown by the plurality of multi-valued image data obtained by the divider, according to a dot arrangement pattern for determining dots to be assigned to a plurality of areas in the pixel, wherein the generator generates the data of dots to compose each of the pixels of the same position, according to a dot arrangement order which is defined for the plurality of areas of the dot arrangement pattern.

In the fourth aspect of the present invention, there is provided an image processing method of generating data of dots composing each of a plurality of divided images for completing an image with superimposing the plurality of divided images, which differ from each other in formation timing, the method comprising: a generating step of generating data of dots composing each of pixels of same positions in the plurality of divided images, according to a dot arrangement pattern for determining dots to be assigned to a plurality of areas in the pixel, wherein the generating step generates the data of dots to compose each of the pixels of the same position, according to a dot arrangement order which is defined for the plurality of areas of the dot arrangement pattern.

In the fifth aspect of the present invention, there is provided an image processing method of generating data of dots composing each of a plurality of divided images for completing an image with superimposing the plurality of divided images, which differ from each other in formation timing, the method comprising: an obtaining step of obtaining a plurality of multi-valued data corresponding to the plurality of divided images; and a generating step of generating data of dots composing each of pixels of same positions shown by the plurality of multi-valued imaged at a obtained by the obtaining unit, according to a dot arrangement order which is defined for L areas of a dot arrangement pattern for determining dots to be assigned to the L areas in the pixel, wherein the generating step generates the data of dots so that X ($1 \leq X \leq L$) dots composing the pixel of the divided image formed at precedent formation timing are assigned to areas of the arrangement order of first to Xth, and generates the data of dots so that Y ($1 \leq Y \leq L$) dots composing the pixel of the divided image formed at subsequent formation timing are assigned to areas of the arrangement order of (X+1)th to (X+1+Y)th.

In the sixth aspect of the present invention, there is provided an image processing method of generating data of dots composing each of a plurality of divided images, for completing an image to be formed on a unit area of a printing medium by performing scanning of an ink-jet head for forming the dots plurality of times onto the unit area so as to superimpose the plurality of divided images on the unit area in the plurality of times of scanning, the method comprising: a dividing step of dividing multi-valued image data representing an image to be formed on the unit area into multi-valued data corresponding to the plurality of divided images; and a generating step of generating data of dots composing each of pixels of same positions shown by the plurality of multi-valued image data obtained by the divider, according to a dot arrangement pattern for determining dots to be assigned to a plurality of areas in the pixel, wherein the generating step generates the data of dots to compose each of the pixels of the same position, according to a dot arrangement order which is defined for the plurality of areas of the dot arrangement pattern.

In the seventh aspect of the present invention, there is provided a printing apparatus that generates data of dots composing each of a plurality of divided images for completing an image with superimposing the plurality of divided images, which differ from each other in formation timing, and performs printing based on the data of dots, the apparatus comprising: a generator for generating data of dots composing each of pixels of same positions in the plurality of divided images, according to a dot arrangement pattern for determining dots to be assigned to a plurality of areas in the pixel; and printing unit for performing the printing based on the generated data of dots, wherein the generator generates the data of dots to compose each of the pixels of the same position, according to a dot arrangement order which is defined for the plurality of areas of the dot arrangement pattern.

According to the present invention, in a case of completing an image by superimposing plural divided images each having a different formation timing, dot data of the divided images can be generated so that a grain in the image is prevented from occurring.

Further features of the present invention will become apparent from the following description of exemplary embodiments (with reference to the attached drawings).

BRIEF DESCRIPTION OF THE DRAWINGS

FIG. 1 is a diagram schematically showing a multi pass printing by a printing head, a dot pattern printed or the like;

BEST MODE FOR CARRYING OUT THE INVENTION

Hereinafter, embodiments of the present invention will be in detail explained with reference to the drawings.

An embodiment of the present invention relates to a mode where ejections of respective inks of cyan (C), magenta (M) and yellow (Y) which are used in an ink-jet printing apparatus are dividedly carried out in two scans for performing printing. In this case, binary image data (hereinafter, also referred to as "dot data" or "ejection data") for driving the print head of each of C, M and Y inks correspondingly to printing operations of divided two scans exists. In the present specification, collection of the image data (binary data or the multi-valued data) distinguished by colors of inks and scans is called as "plane".

Figure 3:
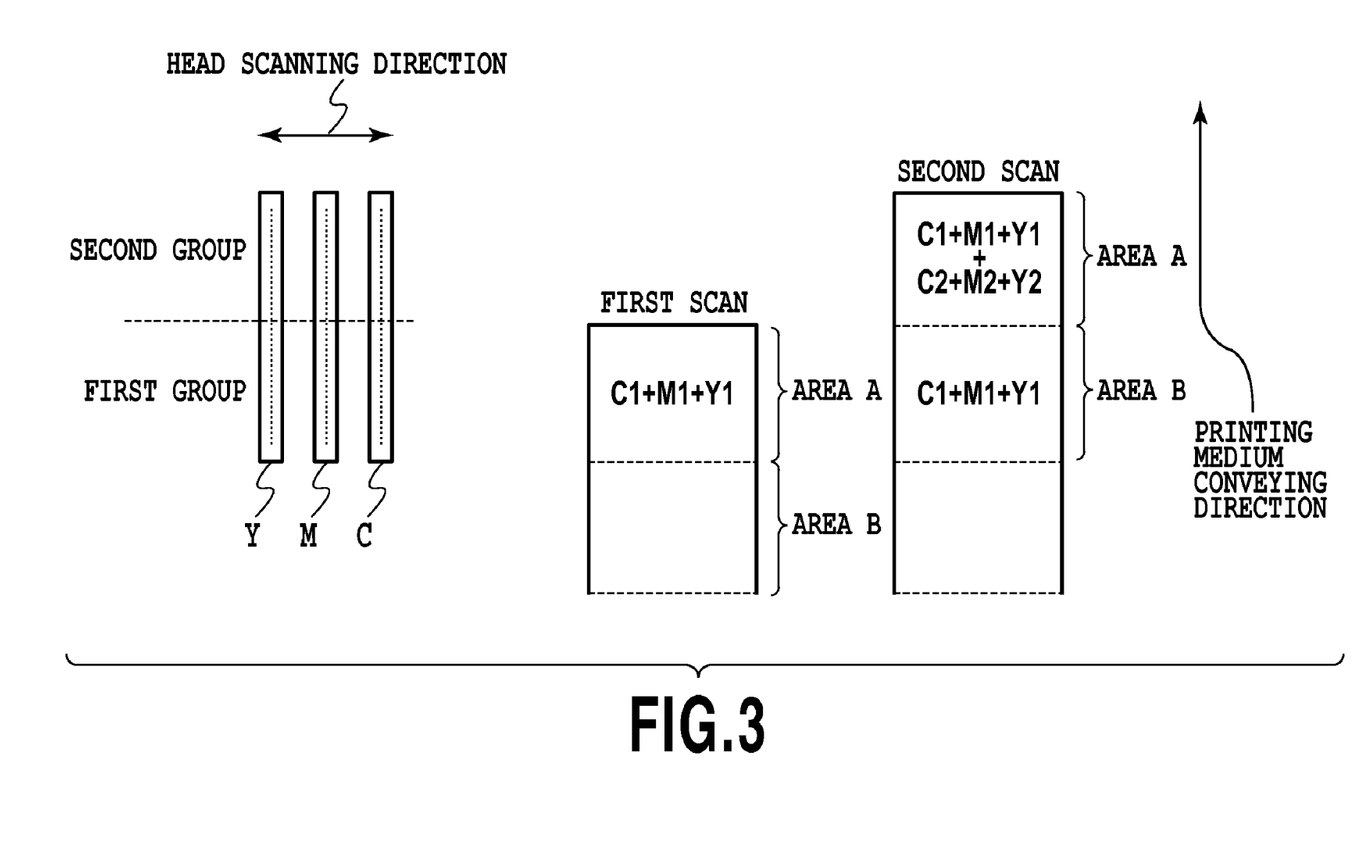
FIG. 3 is a diagram showing a relation between a printing head and a printing medium in a case of carrying out a two-pass printing.

FIG. 3 is a diagram schematically showing a relation between a printing head and a printing medium in a two-pass printing executed in a printer. As explained below, in a case of a two-pass printing, an image to be printed in a predetermined unit area of the printing medium (area having a width obtained by dividing a print head width into a half) is completed by two times of scan of the printing head.

The nozzle group of each color of cyan, magenta and yellow is divided into two groups of a first group and a second group and each group includes 256 nozzles. Accordingly, the total nozzle number of each color is constituted of 512 nozzles.

Scanning operation with the nozzle group of each color is executed to the printing medium in a direction substantially perpendicular to the nozzle arrangement direction (head scanning direction shown in an arrow in the figure) and during the scanning the first and second nozzle groups eject ink onto respective unit areas in the printing medium, each corresponding to an arrangement width of each nozzle group. In this example, ejections of C, M and Y inks are carried out to each unit area based on the binary image data of C, M and Y. In addition, each time one time of scanning terminates, the printing medium is conveyed in the direction perpendicular to the scanning direction ("printing medium conveying direction" shown in an arrow in the figure) by the width amount of one group (here, amount of 256 pixels which is the same as the width of the unit area). In consequence, an image in each unit area is completed by twice of the scans.

Specifically, at the first scan, to area A on the printing medium, the printing is carried out in the order of C, M and Y by using the first group of C nozzle group, the first group of M nozzle group and the first group of Y nozzle group. Next, at the second scan, to area A where the printing in the first scan has terminated, the remaining printing is carried out in the order of Y, M and C by using the second group of C nozzle group, the second group of M nozzle group and the second group of Y nozzle group. Along with this, to area B of the unprinted state, the printing is carried out in the order of Y, M and C by using the first group of C nozzle group, the first group of M nozzle group and the first group of Y nozzle group. Further, by continuation of such operation, the printing is carried out in the order of C1, M1, Y1, Y2, M2 and C2 or Y1, M1, C1, C2, M2 and Y2 to each unit area (area A and area B).

Figure 4A:
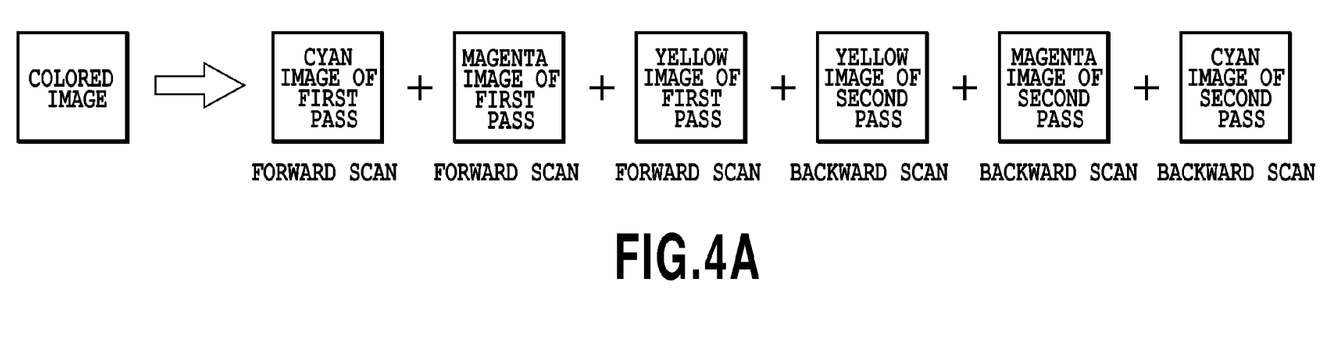
FIGS. 4A and 4B relate to an embodiment of the present invention and are diagrams for explaining a case of carrying out a multi pass printing of two passes by using ink of C, M and Y.
Figure 4B:
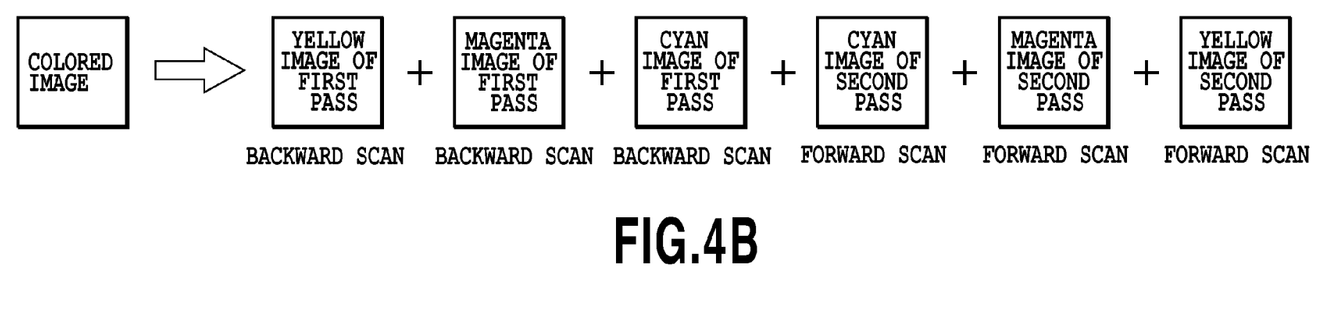

FIGS. 4A and 4B are diagrams for explaining the print order to a unit area in a case of carrying out a multi pass printing of two-passes by using ink of C, M and Y, as shown in FIG. 3.

FIG. 4A shows conditions where an image on an area (area A in FIG. 3) which is printed in a forward and backward scans is completed. In the forward scan (first pass) as the first scan, at first, a cyan image is printed based on dot data of cyan generated by data division and binary data expansion processing to be described later in FIG. 6. Subsequently, at the same scan, likewise a magenta image and a yellow image are printed based on dot data generated by the data division and binary data expansion processing. That is, the magenta image is put over the cyan image printed before the magenta image, and the yellow image is put over the cyan and magenta images printed before the yellow image. In this way, the images are printed in order. At the backward scan (second pass) as the second scan after a predetermined amount of conveying print medium, likewise, based on dot data of yellow, magenta and cyan generated in order by the data division to be described later, images thereof are printed in order by putting one image over the other image printed before the one image.

On the other hand, FIG. 4B shows conditions where an image on an area (area B in FIG. 3) which is printed in a forward and backward scans is completed. In the backward scan (first pass) as the first scan, at first, a yellow image is printed based on dot data of yellow generated by data division and binary data expansion processing to be similarly described later. Subsequently, at the same scan, likewise a magenta image and a cyan image are printed based on dot data generated by the data division and binary data expansion processing to be similarly described later. That is, the magenta image is put over the yellow image printed before the magenta image, and the cyan image is put over the yellow and magenta images printed before the cyan image. In this way, the images are printed in order. At the backward scan (second pass) as the second scan after the predetermined amount of conveying print medium, likewise, based on dot data of cyan, magenta and yellow generated in order, images thereof are printed in order by putting one image over the other image printed before the one image.

In the present embodiment, respective binary data of six planes, which is distinguished by the forward or backward scan and color ink of C, M or Y, are generated by using an index pattern (also referred to as "dot arrangement pattern"). More specifically, 256 valued data of 8 bits for each of C, M and Y is converted into 17 valued data of 5 bits. Thereafter, this 17 valued data is divided by 2 as the number of times of scan for the two-pass printing to be two set of divided data. Then, the binary data expansion using the index pattern is carried out for each of the divided 17 valued data. The 17 valued data has resolution of 600 dpi for one pixel and is changed into a dot arrangement pattern in an area of 4 minor pixels×4 minor pixels as an index pattern for generating the binary data. Accordingly, the resolution of the binary data is 2400 dpi. The index pattern according to the present embodiment, as explained in detail in FIG. 8, determines the dot arrangements (assigns dots) in common for the six planes. According to the present embodiment, for example, an arrangement of the assigned dots is dispersed. Thereby, the dot arrangement in one plane is dispersed and the dot arrangement made between the planes can be dispersed as much as possible. Inconsequence, the deviation of the dots in the intermediate image produced by superimposing some planes is restricted as much as possible, thus reducing the problem of the grain.

For example, binary data of the respective planes is generated so as to have deviation of dots as little as possible in respective dot distributions on the superposed planes of "the first pass C+the first pass M", "the first pass C+the first pass M+the first pass Y", "the first pass C+the first pass M+the first pass Y+the second pass Y", "the first pass C+the first pass M+the first pass Y+the second pass Y+the second pass M", "the first pass C+the first pass M+the first pass Y+the second pass Y+the second pass M+the second pass C", which are obtained by the superposition in an order of the first pass C, the first pass M, the first pass Y, the second pass Y, the second pass M, and the second pass C, which is the ejection order of the printing head in each of scans (hereinafter referred to as pass) by which printing is performed in the order shown in FIG. 4A. In particular, binary data generation is performed so that not only the dispersibility of the final superposition of "the first pass C+the first pass M+the first pass Y+the second pass Y+the second pass M+the second pass C" but also dot distributions of the intermediate superposition of planes ("intermediate image") have deviation of dots as little as possible.

Further, the above-mentioned fact is also true for an area printed in the order in FIG. 4B. That is, data generation can be made so that the distribution of the dots in the similar intermediate image obtained in case of superimposing Y of a first pass, M of the first pass, C of the first pass, C of a second pass, M of the second pass and Y of the second pass in that order is not deviated. In the following explanation, the area in FIG. 4A will be in detail explained and the area in FIG. 4B differs only in the ejection order of ink from the area in FIG. 4A and the similar processing may be executed along the ejection order in the area of FIG. 4B. In addition, the number of the minor pixels in the plane for the processing in the present embodiment is equivalent to 256 minor pixels (nozzle arrangement direction)×the number of the minor pixels corresponding to a printing width (primary scanning direction).

In a case of using a four-color ink further including black (Bk) or even in a case of addition of light ink having a low concentration or specific color ink of red, blue or green, it is apparent from the following description that the present invention can be likewise applied.

Figure 5:
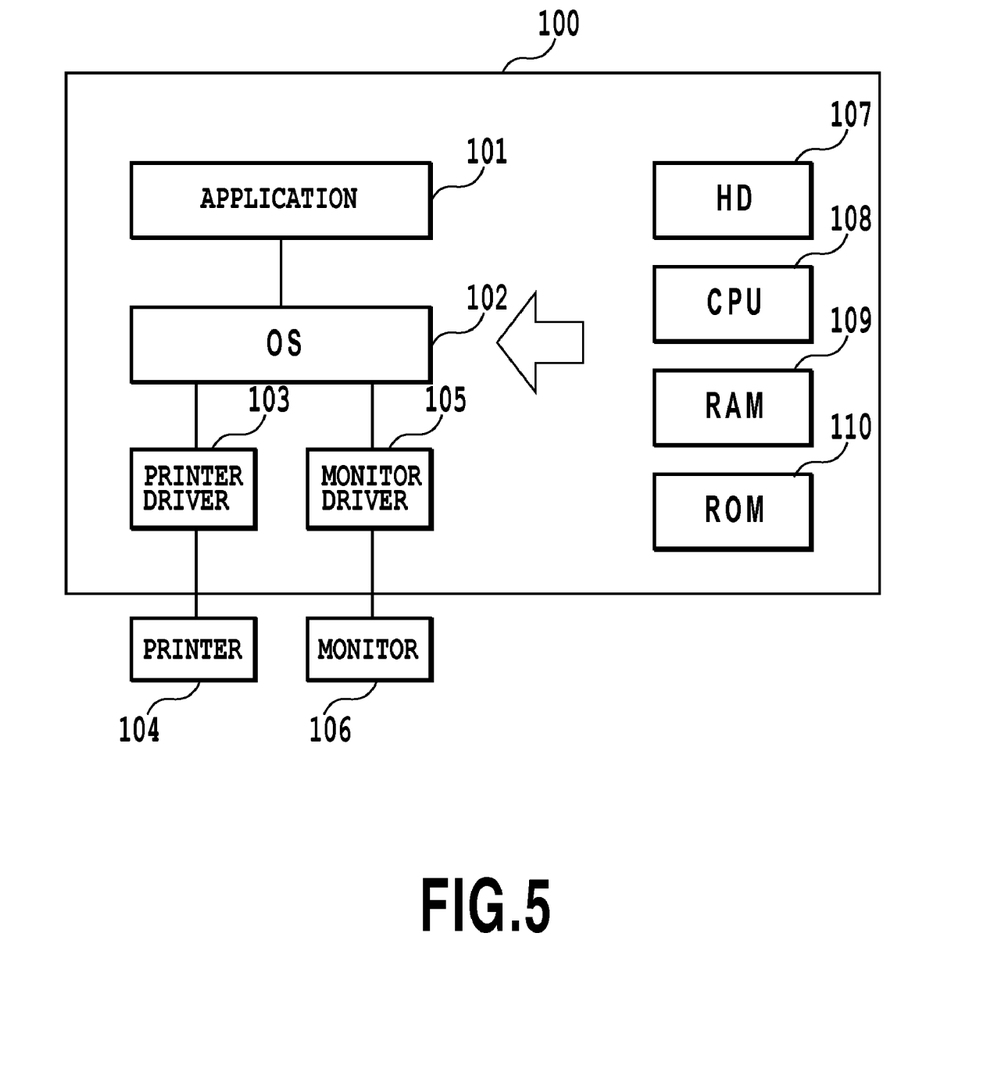
FIG. 5 is a block diagram showing mainly the configuration of hardware and software in a personal computer as an image processing apparatus in a first embodiment of the present invention.

FIG. 5 is a block diagram showing mainly the configuration of hardware and software in a personal computer (hereinafter, simply referred to as PC) as an image processing apparatus (image data generating apparatus) according to a first embodiment of the present invention.

In FIG. 5, PC 100 as a host computer operates each software of application software 101, a printer driver 103 and a monitor driver 105 through an operating system (OS) 102. The application software 101 executes the processing in regard to a word processor, a tabular calculation, an internet browser and the like. The monitor driver 104 executes processing of composing image data displayed on a monitor 106 or the like.

The printer driver 103 processes image data or the like issued from the application software 101 to OS 102 to generate binary ejection data finally used in the printer 104. More specifically, by executing image processing to be described later in FIG. 6, binary image data of C, M and Y used in the printer 104 are generated based on the multi-valued image data of C, M and Y. The binary image data thus generated are transferred to the printer 104.

The host computer 100 is provided with CPU 108, a hard disc drive (HD) 107, RAM 109, ROM 110 and the like as various hardware for operating the aforementioned software. That is, CPU 108 executes the processing according to the above soft programs stored in the hard disc 107 and ROM 110, and RAM 109 is used as a work area at the time of the processing execution.

The printer 104 in the present embodiment is a printer of a so-called serial type in which scanning operation with a printing head for ejecting ink is performed to a printing medium and the printing is carried out by ejecting ink during the scanning operation. A printing head having each ejection opening group corresponding to each ink of C, M and Y is mounted in a carriage and thereby, the scanning operation can be performed to the printing medium such as a print sheet or the like. A printing element such as an electro-thermal converting element or a piezoelectric element is provided in a flow passage communicated with ejection opening of the printing head and the ink is ejected from the ejection opening by driving the printing element. The arrangement density of the ejection openings is 2400 dpi and ink of 3.0 pico liter is ejected form each ejection opening. The number of the ejection openings in the ejection group of each color is 512.

The printer 104 is provided with CPU, a memory and the like (not shown). The binary image data transferred from the host computer 100 are stored in the memory of the printer 104. In addition, the binary image data stored in the memory are read out under control of CPU of the printer 104 and are sent to a drive circuit of the printing head. The drive circuit drives the printing elements of the printing head based on the sent binary image data, thus ejecting the ink from the ejection openings.

The printing system in the present embodiment is, as described in FIG. 3, a multi pass system of a so-called two-pass which sequentially completes printing for a unit area on the printing medium by two times of scan. In this two-pass printing, the binary image data for ejecting ink from each ejection opening in each scan is generated by the image processing described later in FIG. 6. Thereby, as described in FIG. 4A, the deviation in the dot distribution in each superposition of planes obtained by superimposing C of a first pass, M of the first pass, Y of the first pass, Y of a second pass, M of the second pass and C of the second pass in that order can be made to be small.

Figure 6:
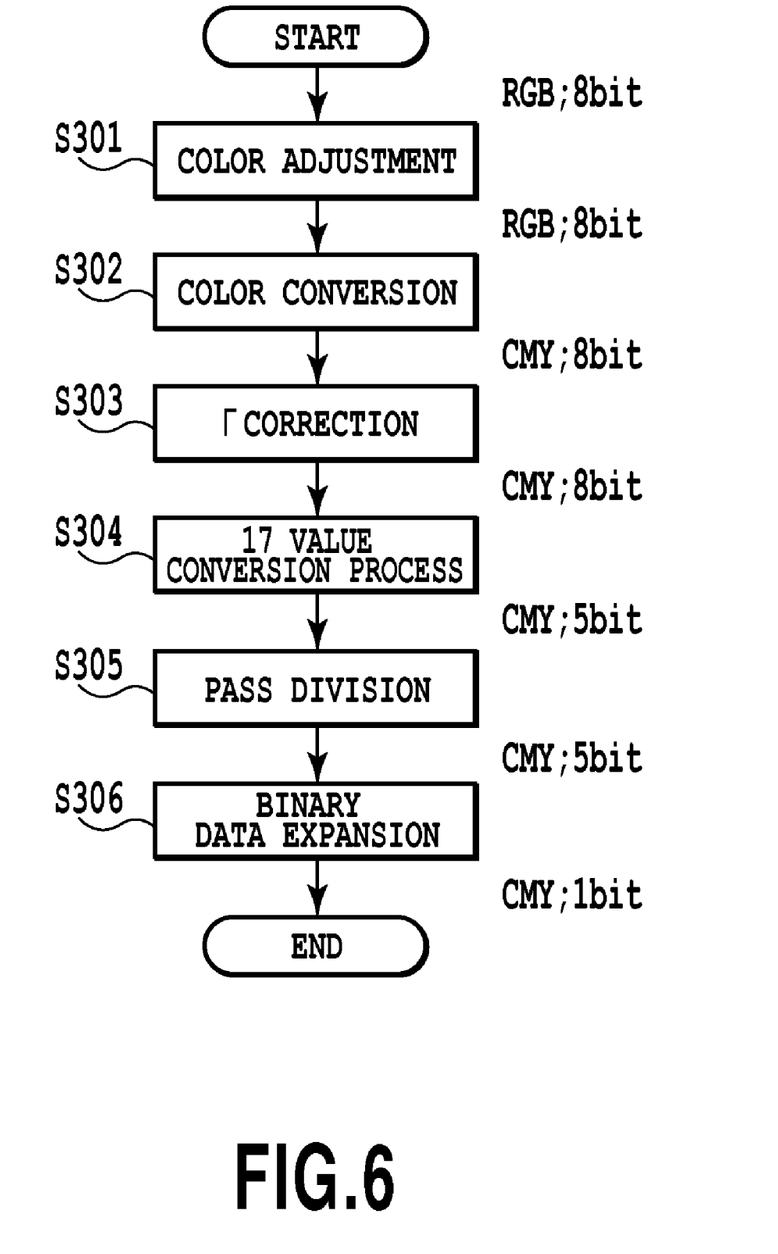
FIG. 6 is a flow chart showing processes of an image processing according to a first embodiment of the present invention.

FIG. 6 is a flow chart showing the processes of an image processing according to a first embodiment of the present invention.

Figure 7:
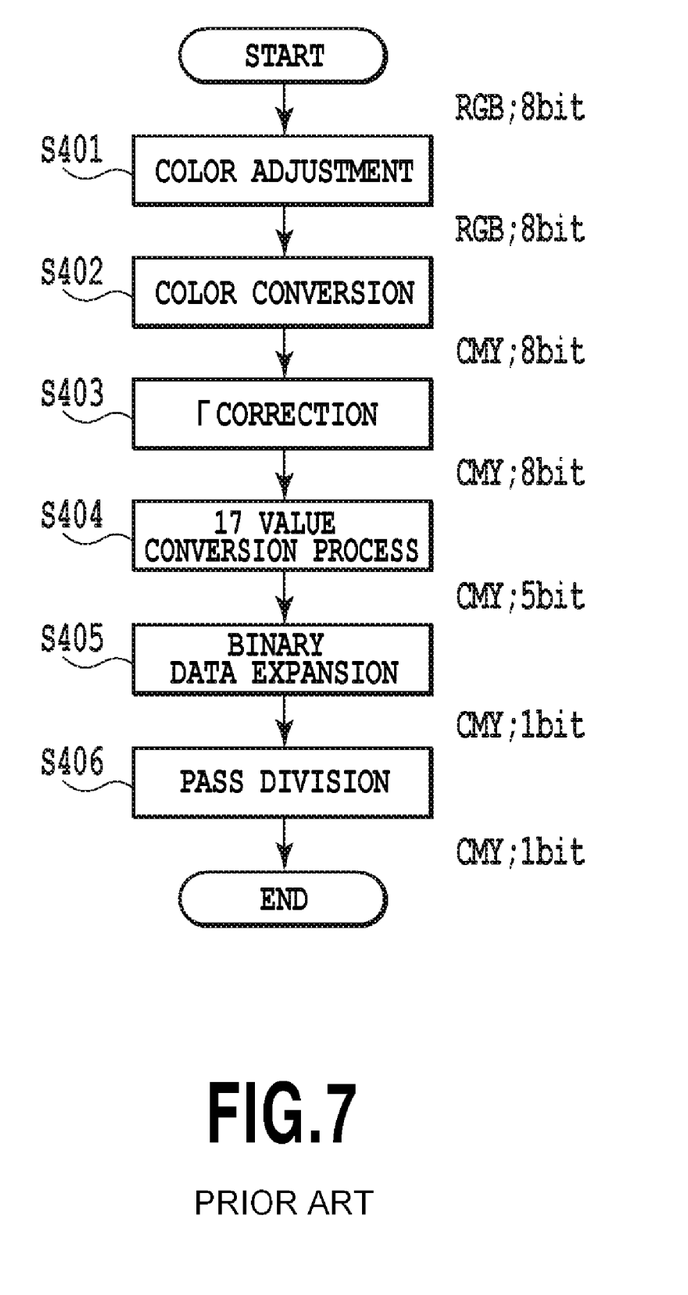
FIG. 7 is a flow chart showing the conventional image processing shown for comparison with the processing in FIG. 6.

FIG. 7 is a flow chart showing the conventional image processing shown for comparison. Hereinafter, among the image processing, in particular, image processing for image data generation process for each plane according to the present embodiment will be explained while comparing with the conventional image processing.

First at step S301 and at step S402, color adjustment processing such as an input γ correction is executed for R, G and B data of the image obtained from an application or the like. Next, at step S302 and at step S402, for image data of R, G and B, a conversion from a color gamut of R, G and B into a color gamut of color components C, M and Y of inks used in a printer is carried out and also a generation of the color component data C, M and Y for expressing the color in the color gamut obtained by the conversion is carried out. These processes are executed usually by using a look-up table in combination with an interpolation calculation. The processing of this step converts the image data of 8 bits for each of R, G and B into the image data of 8 bits for each of C, M and Y (multi-valued image data). Next, at step S303 and step S403, an output γ correction is made to adjust input/output gradation characteristics of the printing head used in the printer 104. Next, at step S304 and step S404 respectively, a 17 value conversion process is executed to obtain multi-valued image data of 17-values. Respective values of the 17-valued data correspond to the numbers of dots arranged in the index pattern to be explained below. The 17 value conversion process may be executed, for example, by a pseudo-gradation sequence process such as an error diffusion process.

Figure 9:
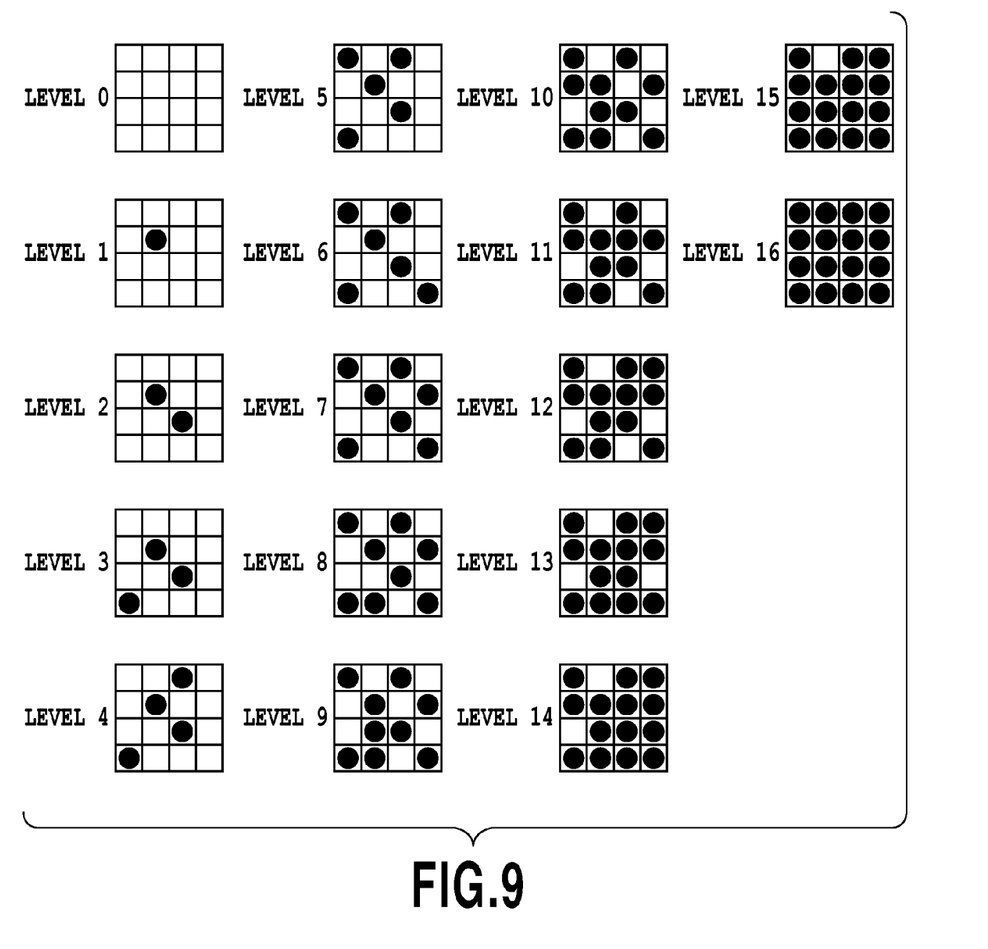
FIG. 9 is a diagram for explaining the conventional dot arrangement pattern.

Next, according to the conventional example shown in FIG. 7, at step S405, a dot arrangement pattern is used for the multi-valued image data of C, M and Y to carry out a binary data expansion, obtaining the binary data. The dot arrangement pattern used in the conventional example is different from a dot arrangement pattern of the present embodiment described later. The dot arrangement pattern used at step S405 has an area of 4 minor pixels×4 minor pixels corresponding to one pixel of 17-valued data. Then, the area shows a pattern where the number and the arrangement of dots are defined in accordance with each value of "0" to "16" shown by 17-valued data (see FIG. 9). In other words, in the processing at step S405, the dot arrangement pattern is selected in accordance with a level value shown by 17-valued data obtained at step S404 for each pixel and the dot arrangement pattern becomes the binary data in an area of 4 minor pixels×4 minor pixels as it is.

Next, the binary image data obtained at step S406 is subjected to a pass division process for obtaining data for two-pass printing. This pass division is executed by using mask patterns as described before in FIG. 2. In this case, as described before, there may be a case where interference between the mask pattern and the binary image pattern occurs. In addition, these mask patterns do not consider the mutual dot arrangement for the dot data of six planes corresponding to two passes of each of C, M and Y, which is generated by use of the mask patterns, and particularly the good dispersion properties the dot arrangement. As a result, the aforementioned grain problem may occur.

In contrast, according to the present embodiment, at step S305, the pass division is made for data at a multi-valued image data level prior to the binarization. More specifically, the 17 valued image data of 5 bits for each of C, M and Y is divided into 17-valued image data corresponding to each of two scans. Then, at step S306, the dot arrangement pattern is applied to each pixel of respective 17-valued image data corresponding to respective two scans, thereby obtaining binary data.

Figure 8:
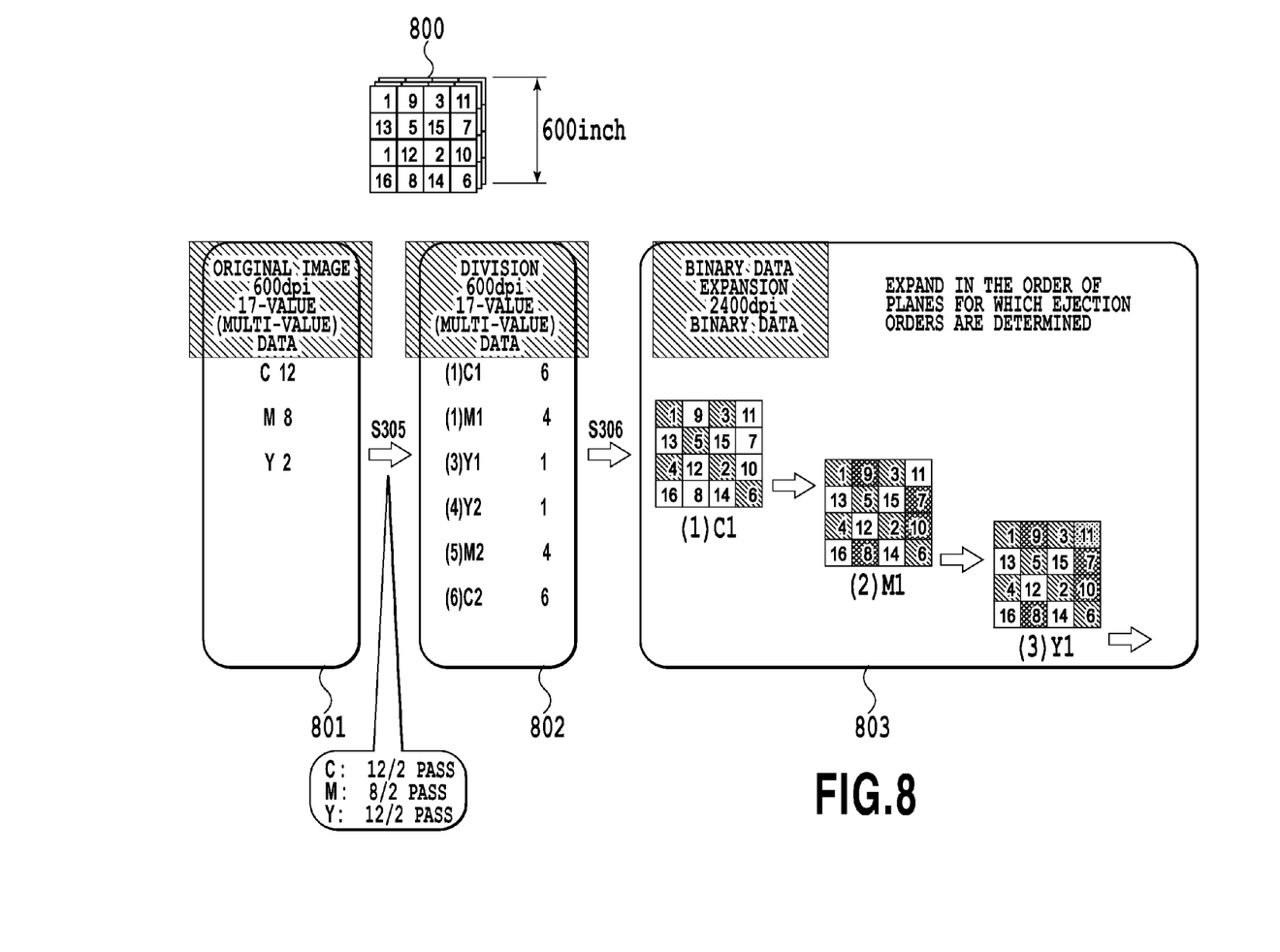
FIG. 8 is a diagram for explaining a detail of a binary data expansion by a pass division shown in FIG. 6 and the index pattern.

FIG. 8 is a diagram for explaining the pass division at step S305 and the binary data expansion at step S306 by use of the dot arrangement pattern.

An example shown in FIG. 8 illustrates a case where values of 17-valued data 801 of a pixel in an original image prior to the pass-division process are that (C, M, Y)=(12, 8, 2). This data is, at step S305, divided into two for two-pass printing to obtain divided data 802. More specifically, data values (C, M, Y)=(12, 8 and 2) are divided by 2 to obtain C1=6, M1=4 and Y1=1 for the first pass, and C2=6, M2=4 and Y2=1 for the second pass.

It should be noted that the above example shows an example of making a two-division in a case of the two-pass printing, but N-division may be, needless to say, made in a case where the multi pass printing is the N-pass printing (N is an integral number of 2 or more). In addition, the N-pass printing (N is an integral number of 2 or more) means a printing mode where the printing head scans N times on a unit area of the printing medium (area having the width obtained by dividing the printing head width (nozzle arrangement width) into N divisions) to complete an image to be printed onto the unit area by N-times of scans. In addition, when the value of the multi-valued data can not be divided in the N division, for example, the remainder is added to the value of the division data one by one according to an order of scan. In an example shown in FIG. 8, when C=13 in data 801, for example, the remainder of 1 as a result of the two-division is added to "C1=6" for the first pass as the first scan to make "C1=7".

Next, in the binary data expansion process at step S306, binary data are obtained by using dot arrangement pattern 800. This pattern is, as shown in FIG. 8, a pattern where the numerals of 1 to 16 are applied at positions mutually dispersed. More specifically, neighboring numerals in a numerical order are arranged so as not to be neighbored to each other as much as possible. Specifically, the arrangement according to the present embodiment is the same arrangement as a Bayer type dither matrix where the numerals of 1 to 16 are arranged as threshold values. In other words, the numerals in the dot arrangement pattern are dispersed for the numerical order of the numerals. It should be noted that here, there is used a pattern designed in such a manner that neighboring numerals are arranged so as not to be neighbored to each other as much as possible, but the method of the numeral arrangement is not limited to one based upon such design concept. As described later, the present invention is featured in that the dot arrangement pattern for defining the order (dot arrangement order) of arranging dots for plural areas (minor pixels) in a pixel is used in common among different colors and different passes of the same color, and therefore requires only the establishment of this feature. Accordingly, the Bayer type arrangement to which the present embodiment uses is simply one preferable example.

The numerals of "1" to "16" in dot arrangement pattern 800 show the order (priority of the arrangement) of arranging dots ("1" of binary data). Then, by using dot arrangement pattern 800 where such dot arrangement order (priority of the arrangement) is defined, the dot data of each of C, M and Y is arranged (assigned). This arrangement order follows the application order of ink in the two-pass printing. An example shown in FIG. 8 shows an arrangement order according to the application order shown in FIG. 4A. More specifically, as shown in divided data 802, C1 data is assigned at the first, M1 data is assigned at the second, Y1 data is assigned at the third, Y2 data is assigned at the fourth, M2 data is assigned at the fifth and C2 data is assigned at the sixth.

Specifically, as shown in assigned data 803, firstly six dot data in accordance with a value of C1=6 are arranged according to the numeral showing the arrangement order of dot arrangement pattern 800. That is, the dot data of C is arranged in each minor pixel of the numerals of "1" to "6". Next, four M dot data in accordance with a value of M1=4 are arranged in each minor pixel of the numerals of "7" to "10". Further, one Y dot data in accordance with a value of Y1=1 is arranged in the minor pixel of the numeral of "11". Hereinafter, likewise the dot data of the number in accordance with the data value of Y2, M2 and C2 are arranged in this order according to the numeral showing the arrangement order of dot arrangement pattern 800. In this arranging, when the numeral showing the arrangement order exceeds "16", the similar arrangement is repeated by using the dot arrangement pattern showing the same arrangement order. As a result of the processing described above, the binary (dot arrangement) data in an area of 4 minor pixels×4 minor pixels in each of C of the first pass, M of the first pass, Y of the first pass, Y of the second pass and M of the second pass and C of the second pass can be obtained. Concretely, data of C at the first pass is data corresponding to minor pixels, to which hatchings are given, in data (1) C1 of the assigned data 803 in FIG. 8. Further, data of M at the first pass is data corresponding to minor pixels, to which cross-hatchings are given, in data (2) M1 of the assigned data 803 in FIG. 8. Furthermore, data of Y at the first pass is data corresponding to a minor pixel, to which dots are given, in data (3) Y1 of the assigned data 803 in FIG. 8.

At step S306, further, the above described process for each pixel is similarly executed with sequentially changing an object pixel, in accordance with 17-value data of the object pixel. In consequence, for six planes distinguished by a combination of the first pass or the second pass and any of C, M and Y respectively, binary data corresponding to "256 minor pixels (nozzle arrangement direction)×the number of pixels (main scanning direction) corresponding to the print width" with resolution of 2400 dpi can be obtained.

It should be noted that the above described embodiment explains an example where dot arrangements are sequentially determined with following the dot formation (ink application) order to the unit area of the printing medium, but even if this order is reversed, the same effect can be achieved. For example, at the first pass, in a case of forming dots in the order of C, M and Y, dot arrangements of each plane may be defined in the order of Y, M and C.

As described above, a pass division is executed prior to a binarization process and the binarization is executed for the multi-valued data obtained by the pass division while determining a dot arrangement. As a result, grains are prevented from caused. Particularly, according to the present embodiment, since the dot arrangement pattern for defining the order of arranging dots is used in common among different colors, the probability that dots having different colors printed by the same pass are overlapped at the same position can be reduced. Further, numerals for defining the arrangement order of the index pattern are arranged in Bayer type and therefore, in an area of 4 minor pixels×4 minor pixels, dots of respective ink colors of each pass are arranged so as to be mutually dispersed. In addition, since the mutual dot arrangements in six planes of the two-pass of C, M and Y obtained by repetition of the area of 4 minor pixels×4 minor pixels retain the dispersion properties in the area of 4 minor pixels×4 minor pixels, the dot arrangements are made to be dispersed even between planes. In consequence, even if penetration of ink is not sufficiently carried out at a stage of an intermediate image where the print image is not completed, because of a relative relation between the ink and the printing medium, the probability that ink where the penetration is not sufficiently carried out is in contact with each other to form the grains of the ink is reduced. That is, occurrence of so-called beadings can be restricted. In addition, even if the grains exist or the beadings occur due to the grains, these grains or the beadings are distributed so as to be dispersed in such a manner as to decrease the low frequency component, thereby making it possible to reduce an adverse influence thereof on a quality of the print image.

Then, considering that it is not necessarily required that the ink penetration is sufficiently carried out at an intermediate image level, as a result, it is possible to shorten the printing time difference between planes, that is, the ejection time difference in the printer 104. For example, a carriage speed or an ejection frequency can be increased. Further, usually in the case that the pass number in the multi-pass printing is set to four passes for the purpose of sufficiently penetrating the ink, the multi-printing with two passes may be executed.

It should be noted that in a printing system of using ink of a reaction system where ink and non-colored, transparent liquid or ink are mixed to generate insoluble substances, the configuration similar to the above can be applied. That is, a pass division process and a binary data expansion process similar to the above are executed for planes of binary data of the ink or the liquid of the reaction system, so that the dot distribution of the plural, superposed planes can be made to have good dispersion properties with few low frequency components. This allows the probability that at an intermediate image levels, for example, neighboring inks or the like where the penetration is insufficient unnecessarily reacts with each other to form a grain of the insoluble substances to be made small and even if such grain is made, it is possible to make it indistinctive.

Second Embodiment

The first embodiment uses the dot arrangement pattern for defining the order of arranging dots in common between different colors, but the present invention is not limited to this. The dot arrangement pattern is not applied between different colors, but may be applied in common only between different passes in the same color. Accordingly, in the second embodiment, there will be explained a case where a dot arrangement pattern for defining the arrangement order for plural areas (minor pixels) within a pixel is used in common between different passes in the same color.

Like the first embodiment, in the second embodiment, positions where dots are arranged for the preceding pass and positions where dots are arranged for the subsequent pass are determined according to the numerals of 1 to L as the dot arrangement order shown in the dot arrangement pattern constituted by an area of L pieces of m×n. More specifically, in a case of arranging X ($1 \leq X \leq L$) dots for the preceding pass and Y ($1 \leq Y \leq L$) dots for the subsequent pass to one pixel of the multi-valued, the X dots are arranged to positions of the numerals of 1 to X indicated by the dot arrangement pattern and the Y dots are arranged to positions of the numerals of (X+1) to (X+1+Y). It should be noted that when the numeral exceeds L, dots are again arranged in order from a position of the numeral 1.

In detail, there is considered a case where four C dots are arranged at the first pass and three C dots are arranged at the second pass to one pixel of the multi-valued by using the dot arrangement pattern in FIG. 8. First, the dot data of C is arranged in a minor pixel of each of the numerals "1" to "4" for the first pass. Next, the dot data of C is arranged in a minor pixel of each of the numerals "5" to "7" for the second pass. Dots are arranged in the same way even when the pass number increases.

Here, the arrangement of C dots is explained, but the arrangement of the other color dots is the similar to that of C dots. Therefore, the dot arrangement processing at the aforementioned color is executed independently for each color.

As explained above, according to the present embodiment, since the dot arrangement pattern for defining the order of arranging dots is used in common between different passes in the same color, it is possible to reduce the probability that the dots of the same color printed at different passes are overlapped at the same position.

Other Embodiment

In the explanation of the present embodiment, a size of an area of the index pattern is made to that of 4 minor pixels×4 minor pixels, but the present invention is, needless to say, not limited thereto. This size may be defined in accordance with a specification of a printer or the like and in general, may be made to that of m minor pixels×n minor pixels (each of m and n is an integral number of 2 or more).

In addition, in the above embodiments, a printer driver operating in a personal computer carries out the pass division and the binary data expansion at step S305 and step S306 among the processing in FIG. 6, but the present invention is not limited to this configuration, needless to say. For example, the data division may be carried out by hardware such as ASIC in an image printing apparatus (printer 104 in FIG. 5). For example, an exclusive ASIC executing the image processing in FIG. 6 may be provided within the printer 104 which is capable of executing a series of processes in the image processing in FIG. 6 to carry out data generation by using the ASIC based upon controlling CPU in the printer. In this case, the printer serves as an image processing apparatus (image data generating apparatus) for executing the image processing as the feature of the present invention (pass division and error diffusion).

In addition, the above embodiments for a case of generating dot data of two passes is explained, but the present invention may be applied to use of any pass number including three passes or four passes. In this case, the division number, needless to say, corresponds to the pass number used.

Further, the present embodiment describes an example of a multi pass printing using ink of C, M and Y, but it is apparent that the present invention may be applied to dot data generation in plural planes in accordance with the number of the scan times in the multi pass printing in a case of using ink of one color. Further, it is apparent that the present invention may be also applied to data generation in a case of completing an image by carrying out a multi pass printing in such a manner as to carry out printing by reciprocation of the same printing head in a unit area. That is, in any case of carrying out dot data generation of the divided image in a case of completing an image by superimposing plural divided images having different formation timings, binary data can be obtained by using an index pattern for defining the numerals showing the arrangement order.

The present invention is put into practice by executing program codes of software such as those shown in FIG. 6, for example, which are supplied to a computer in an apparatus or a system connected to various devices to operate these devices so as to implement the functions of the above described embodiments, so that the various devices are operated in accordance with the programs stored in the computer (CPU or MPU) of the system or apparatus. In this case, the program codes of the software themselves implement the functions of the above described embodiments, so that the program codes themselves and means for supplying them to the computer, for example, a storage medium storing such program codes constitute the present invention.

The storage medium storing such program codes may be, for example, a floppy disk, a hard disk, an optical disk, a magneto-optical disk, a CD-ROM, a magnetic tape, a nonvolatile memory card, or a ROM.

In addition, if the functions of the above described embodiments are implemented not only by the computer by executing the supplied program codes but also through cooperation between the program codes and an OS (Operating System) running in the computer, another application software, or the like, then these program codes are of course embraced in the embodiments of the present invention.

Furthermore, a case is of course embraced in the present invention, where after the supplied program codes have been stored in a memory provided in an expanded board in the computer or an expanded unit connected to the computer, a CPU or the like provided in the expanded board or expanded unit executes part or all of the actual process based on instructions in the program codes, thereby implementing the functions of the above described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-341383, filed Dec. 19, 2006, which is hereby incorporated by reference herein in its entirety.

The invention claimed is:

1. An image processing apparatus that generates binary data composing each of a plurality of divided images for completing an image with superimposing the plurality of divided images, which differ from each other in formation timing, said apparatus comprising:
    an obtaining unit for obtaining a plurality of multi-valued data corresponding to the plurality of divided images for obtaining a plurality of binary data composing each of the plurality of divided images; and
    a generator for generating binary data composing each of areas located in same positions of the plurality of divided images shown by the plurality of multi-valued image data obtained by said obtaining unit, according to a dot arrangement order which is defined for L positions of a dot arrangement pattern for determining dots to be assigned to the L positions in each area,
    wherein said generator generates the binary data so that X ($1 \leq X \leq L$) dots assigned in the area of each of the plurality of divided images that is formed at precedent formation timing are assigned to positions of the arrangement order of first to Xth, and generates the binary data so that Y ($1 \leq Y \leq L-X$) dots assigned in the area of each of the plurality of divided images that is formed at subsequent formation timing are assigned to positions of the arrangement order of (X+1)th to (X+Y)th.

2. The image processing apparatus as claimed in claim 1, wherein the plurality of divided images which differ from each other in formation timing are images formed in respective scans in a plurality of scans with an ink-jet head, which are executed for forming dots of the same color.

3. The image processing apparatus as claimed in claim 1, wherein the plurality of divided images which differ from each other in formation timing are images formed with dots of different colors.

4. The image processing apparatus as claimed in claim 1, wherein the plurality of divided images which differ from each other in formation timing are images formed in different scans with an ink-jet head, which are executed for forming dots of the same color, or images formed in same scans with an ink-jet head, which are executed for forming dots of different colors.

5. An image processing method of generating binary data composing each of a plurality of divided images for completing an image with superimposing the plurality of divided images, which differ from each other in formation timing, said method comprising the steps of:

obtaining a plurality of multi-valued data corresponding to the plurality of divided images for obtaining a plurality of binary data composing each of the plurality of divided images; and generating binary data composing each of areas located in same positions of the plurality of divided images shown by the plurality of multi-valued image data obtained by said obtaining step, according to a dot arrangement order which is defined for L positions of a dot arrangement pattern for determining dots to be assigned to the L positions in each area, wherein said generating step generates the binary data so that X ($1 \leq X \leq L$) dots assigned in the area of each of the plurality of divided images that is formed at precedent formation timing are assigned to positions of the arrangement order of first to Xth, and generates the binary data so that Y ($1 \leq Y \leq L-X$) dots assigned in the area of each of the plurality of divided images that is formed at subsequent formation timing are assigned to positions of the arrangement order of (X+1)th to (X+Y)th.

* * * * *